United States Patent Office 2,990,307
Patented June 27, 1961

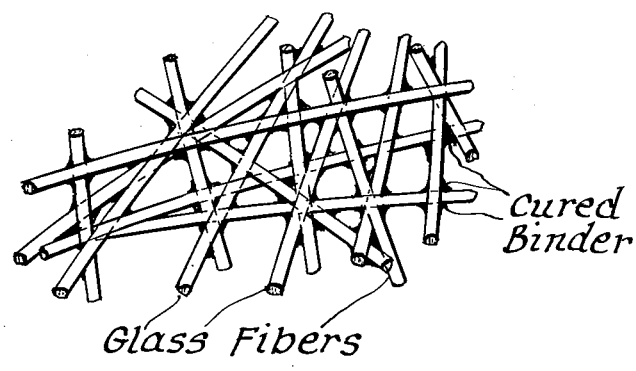

2,990,307
BONDED GLASS FIBER STRUCTURES AND COMPOSITIONS EMPLOYED IN SAME
Joseph P. Stalego, Newark, Ohio, assignor to Owens-Corning Fiberglas Corporation, a corporation of Delaware
Filed Apr. 11, 1957, Ser. No. 652,234
15 Claims. (Cl. 154—43)

This invention relates to bonded glass fiber structures, such as are employed as thermal insulation, pipe wrap and the like. It relates more particularly to a binder for use with glass fibers and the like mineral fibers in the manufacture of thermal insulation products which, in the fabrication thereof, has an improved distribution of resinous binder, increased cure rate, improved processing and handling characteristics, and which, in the fabricated structure, has increased strength under dry and wet conditions with minimum depreciation of strength from dry to wet conditions, increased punking resistance, increased thermal stability, and is incapable of supporting combustion.

Various systems have been employed as binders for use with glass fibers in the manufacture of thermal insulation products. In general, these may be divided between systems formed chiefly of organic components as distinguished from systems formed chiefly of inorganic materials. From the standpoint of the desirability to make maximum utilization of the high heat resistance and thermal stability of glass fibers, it is desirable to make use of inorganic binders which are not subject to thermal break-down or combustion. Such inorganic materials, however, are limited in many respects, as from the standpoint of cost, ease of application and cure, flexibility and toughness, and freedom from attack on the glass fibers combined therewith. It is preferred, wherever temperature conditions permit, to make use of organic binders in the manufacture of such molded or formed bonded insulation products of glass fibers since the organic binders are generally lower in cost, easier to apply, more easily and rapidly cured, and they are less capable of attacking the fine glass fibers or filaments and the bonded structures formed thereof are characterized by higher strengths, greater flexibility and they are more capable of being pleated, formed or the like, for various applications.

The property which minimizes more wide-spread use of insulation products bonded with organic resinous systems stems from the inability of the organic materials making up the binder to stand up under the elevated temperature conditions employed in use and sometimes employed in manufacture. At temperatures in excess of 350° F., the organic components of the binder begin to break down with still more rapid deterioration at higher temperatures until temperatures are reached at which the organic binder is burned out or otherwise substantially eliminated. Such organic binders are also often capable of undesirably supporting combustion to the extent that they cannot be exposed to direct flame or combustion temperatures.

In the fabrication of the insulation, the temperature conditions existing when the binder is combined with the glass fibers in forming sometimes cause the organic component of the binder to punk to the extent that deterioration of the product takes place or, more undesirably, to the extent that the binder may burst into flame during the manufacture of the insulation or in subsequent storage or transportation with the consequent loss of materials and danger of conflagration or destruction of associated elements.

Widespread investigations have been conducted with the intent of improving the thermal, punking and combustion characteristics of organic binder systems capable of use in various combinations with glass fibers as in the manufacture of bonded glass fiber products such as acoustical tile, pipe wrap, bonded insulation products and the like.

Thus it is an object of this invention to produce bonded insulation products of the type described embodying the many advantages of the organic binder systems but having improved thermal, punking and combustion characteristics, and it is a related object to provide a binder composition for use with glass fibers or other siliceous fibers in the manufacture of same.

It is an object of this invention to produce a bonded glass fiber product of the type described in which the described improvements in thermal and combustion characteristics can be made available without sacrifice of any of the desirable processing and performance characteristics present in the manufacture of glass fiber structures bonded with organic resinous systems and wherein, as a matter of fact, improvements are secured in the application and distribution of the binder in the glass fiber structure, in which improvements are secured in the bonding relationship developed between the binder composition and the glass fibers in the structure thereby to produce a molded product having improved strength and performance characteristics, and wherein the loss in properties of the structure as between wet and dry conditions is greatly minimized thereby markedly to increase the wet strength of the product and also to improve the characteristics with respect to the volume, specific gravity and strength of the glass fiber structure.

These and other objects and advantages of this invention will hereinafter appear and for purposes of illustration, but not of limitation, an embodiment of this invention is shown in the acompanying drawing, in which—

FIGURE 1 is a perspective view of a fragmentary portion of a bonded glass fiber structure embodying the features of this invention with the elements specifically designated therein.

It has been found in accordance with the practice of this invention that an improved glass fiber structure of higher strength, better thermal characteristics, resistance to punking, and incapable of supporting combustion can be fabricated with a binder system that employs in combination (1) A curable phenol-aldehyde resin in an intermediate stage of polymeric growth, and preferably in a water soluble A stage, (2) A curable melamine-aldehyde resin in an intermediate or water soluble stage, (3) An alkyd resin preferably embodied in aqueous medium in solution or dispersion, (4) An intermediate condensation reaction product of urea, boric acid and formaldehyde in substantially equimolecular proportions and a polyglycol present in an amount up to 10 percent by weight of the urea, boric acid, and formaldehyde, which compound is hereinafter referred to as a urea-borate, (5) An oleaginous lubricant, and (6) An organic silicone oil or fluid.

The following will represent a specific formulation embodying the practice of this invention:

*Example 1*

Composition:
    38.0 percent by weight urea-borate (Booty Resineers, Tybon 5611)
    9.0 percent by weight melamine-formaldehyde resin (Resamine RD–140, Monsanto Chemical Company)
    24.0 percent by weight phenol-formaldehyde
    24.0 percent by weight alkyd resin (G62–75W, Hercules Powder Company)

Composition:
   4.8 percent by weight oleaginous lubricant (K-2-B tempering oil)
   0.2 percent by weight silicone oil (DC-1107 Emulsion, Dow Chemical Company)
   Ammonium hydroxide (about 9 gallons per 1000 gallons of water)
   Water in amount to reduce the solids to about 10%

*Procedure.*—In formulating the binder composition of the foregoing materials, about one-third of the water is introduced into a mixing tank fitted with an agitator. The alkyd resin, the ammonia, the urea-borate, and the melamine-formaldehyde resin are added in order to the water in the tank with agitation. To this mixture, the phenol-formaldehyde resin, the oleaginous lubricant and the silicone fluid are added in order along with sufficient dyestuff to impart color to the treating composition. Then the remainder of the water is introduced and the mixture adjusted with ammonium hydroxide to a pH of about 8.

The binder composition can be embodied in the usual manner for the fabrication of structural tile, bonded insulation or pipe wrap, as by flooding the collected mat of glass fibers and draining off the excess or by applying the binder composition onto the glass fibers during mat formation or the like. For cure, the mass is heated to a temperature in excess of 350° F. and preferably within the range of 500–650° F. for a time sufficient to advance the components. The time and temperature will depend in part on the amount of binder in the final structure and the thickness and density of the structure that is formed. For a structure having a thickness ranging from ½ to 1 inch, a time ranging from 1–5 minutes will be sufficient at a temperature within the range of 500–600° F.

The means by which the glass fibers are formed for use in the described system is relatively unimportant. Use can be made of discontinuous or staple glass fibers such as are formed by the rapid attenuation of multiple streams of molten glass by high pressure streams of air or steam directed angularly downwardly onto the streams of molten glass flowing therebetween. Instead, use can be made of continuous or textile fibers such as are formed by the rapid attenuation of molten streams of glass. The continuous glass fibers may be employed in the form of mats fabricated thereof as by swirling the endless filaments or strands of continuous fibers, or they may be chopped or cut to shorter lengths for mat or batt formation. Use can also be made of ultra-fine fibers of glass such as are formed by the attenuation of rods of glass reduced to a flowable state, which filaments can be employed as formed or cut to shorter lengths. Use can be made of various combinations of such fibers and materials, with or without previous treatment of the fibers as in the application of a size, anchoring agent or other modifying agent. The glass fiber component will represent the principal material of the bonded structure. Usually 97–70 percent by weight of the product will be composed of the glass fibers while the amount of binder will be in reverse proportion ranging from 3–30 percent, depending upon the density and character of the bonded product. Bonded structures having a density of as low as a few pounds per cubic foot may be formed with binders present in the lower range of concentration while molded or compressed products having a density as high as 30–40 pounds per cubic foot can be fabricated of systems embodying the binder composition in the higher proportion of the described range.

It will be apparent from the foregoing specific description of the practice of this invention, that the binder system employed in combination with glass fibers represents a system formed chiefly of organic components, yet the product formed upon cure is capable of use at high temperatures without thermal break-down of the insulation and without punking or burning out of the binder.

The alkyd or polyester resinous component has been employed for its ability to contribute thermal stability, improved adhesion, and better flow characteristics to the composition in the system in which it is employed. Use cannot be made of the alkyd resinous component alone in the binder because such resinous materials are so slow to cure that systems based upon the use of alkyd resin have been incapable of manufacture in a practical or efficient manner into glass fiber structures and insulation products. However, in the combination described, the deficiency with respect to the cure of the alkyd resinous component appears to be overcome since a rapid and controlled cure is capable of being secured in the combination of materials described. The alkyd resinous component, such as is formed by condensation reaction between a polyhydric alcohol and a polybasic acid are well known to the industry, thus detailed description thereof should here be unnecessary. In the system described, the alkyd resinous component, preferably in a water soluble state, can be employed in an amount within the range of 5–50 percent by weight of the binder composition solids but it is preferred to make use of the component in an amount within the range of 10–25 percent by weight.

Phenol-formaldehyde resinous materials have previously been employed as a binder for glass fibers either alone or in combination with such diluents as the Vinsol type resins wherein the latter can be present in amounts ranging from 0–50 percent by weight of the phenol-formaldehyde component. As used herein, the term "Vinsol resin" is intended to include the alcohol soluble residue of pinewood pitch and it is formed primarily of abietic acids and derivatives thereof. The phenol-formaldehyde resinous materials have been subject to thermal break-down at temperatures in excess of 350° F. and they have been known to punk readily during fabrication of the bonded insulation or afterwards. Such phenol-formaldehyde binders have also been found to be capable of readily supporting combustion at elevated temperatures.

In the system described, the combination of the phenol-formaldehyde resinous material with the other components, the thermal deficiencies of the phenol-formaldehyde resins are, in part, alleviated while the bonding and cure characteristics are retained to produce a binder having many of the desirable characteristics of systems heretofore employed from the standpoint of adhesiveness, stability and cure, while introducing thermal stability and resistance to punking. The phenol-formaldehyde resinous component, with or without a corresponding dilution with Vinsol resins, can be employed in the system described in an amount within the range of 5–50 percent by weight of the binder solids but preferably in an amount within the range of 15–35 percent by weight. As the phenol-formaldehyde resin, use can be made of conventional reaction products of phenol and formaldehyde in an intermediate or water soluble A stage of polymeric growth but it is preferred to make use of a filtered phenol-formaldehyde resin.

When used alone, melamine-formaldehyde resins have been found to be incapable of supporting combustion or of punking, though they are still subject to deterioration at elevated temperatures in excess of 350° F. Such resinous materials, when used alone, have also been subject to such rapid and relatively uncontrolled rate of cure that it has been difficult to utilize melamine-formaldehyde as a binder for molded glass fiber products. However, in the combination described, the melamine-formaldehyde resinous component becomes incapable of pre-curing separate and apart from the materials employed in combination therewith. As a result, a binder system having a desirable and controlled curing rate is capable of being secured with melamine-formaldehyde resins present as an essential component thereof while the melamine-formaldehyde component contributes, in part, to many of the other desirable characteristics of the binder. The melamine-formaldehyde condensation reaction product is employed in an intermediate stage of polymeric growth in an amount within the range of 3–35 percent by weight of the binder solids and preferably in an amount within the range of 5–15 percent by weight. Such melamine-formaldehyde resins as can be employed are well known in the trade, as represented by "Resamine RD-140," marketed by the Monsanto Chemical Company.

The role contributed by the urea borate to the binder system described is, for the present, incapable of description or projection since the mechanism by which the urea borate ties in with the other component is not fully understood. It is known, however, that the urea borate present in combination with such other materials in the binder system increases the thermal stability of the combination of materials forming the binder without interference or loss in the bonding relationship capable of being developed with the glass fibers and without conflict with the desired rate of cure in the manufacture of molded or bonded insulation products or other glass fiber structures. The urea borate, as employed, identifies a series of condensation reaction products marketed by Booty Resineers under the trade name "Tybon."

As used herein, the term "urea borate" is intended to define the condensation reaction product of urea, boric acid, formaldehyde and ethylene glycol, such as may be represented by the material marketed by Booty Resineers under the trade name "Tybon 5411." The following is a representation of a formulation for use in the manufacture of a urea borate which may be employed in the practice of this invention.

In the manufacture of a 200 pound batch, 5 pounds of boric acid and 10 pounds of ethylene glycol are combined with a base which is formed of urea formaldehyde present in the ratio of 5 parts by weight formaldehyde to 4 parts by weight urea. In a still further example, 5 parts by weight of formaldehyde are combined with 4 parts by weight of urea and the boric acid is added in the amount of 2.5 percent by weight of the total weight of formaldehyde and urea and then ethylene glycol is added in an amount of 10 percent by weight of the total weight of formaldehyde and urea.

Other polyhydric alcohols such as diethylene glycol, propylene glycol, glycerol and the like may be substituted for ethylene glycol in the above formulations. Other nitrogen based aldehyde resins such as dicyandiamide-formaldehyde, melamine-formaldehyde, urea-formaldehyde, or guanidine-formaldehyde may be substituted in whole or in part for the urea in the urea borate. For purposes of description it will be understood that the term "urea borate" is intended to include such other compounds. It will be further understood that the ingredients of the urea borate may be varied in amounts within reasonable limitations well known to the resin chemist.

In the system described, the urea borate is employed in an amount within the range of 5–60 percent by weight based upon the binder solids and preferably within the range of 25–40 percent by weight.

The oleaginous lubricant is not essential to the binder composition but its use is desirable for the binders applied in the manufacture of structures of low density or products adapted to embody the properties of high flexibility or deformability. As the oleaginous lubricant, use can be made of mineral oils, sulfonated oils and the like materials as are described in the Williams and Bone Patents No. 2,107,284 and No. 2,083,132. As represented, use can be made of K₂B tempering oil which is a mineral oil base. When employed, the oleaginous lubricant can be formulated into the composition preferably as an emulsion in an amount ranging from 1–10 percent by weight of the binder solids and preferably in an amount within the range of 1–4 percent by weight.

With reference to the organo silicon fluid, when the latter is employed in the binder system in an amount of about 0.2 percent by weight or greater, based upon the binder solids, little if any loss in strength is noticed in the product when wet as compared to the same product under dry conditions. This is a bit unusual with glass fiber reinforced products because of the preferential attraction of the glass fiber surfaces for moisture whereby the resinous binder, if formed of an organic material, becomes substantially separated from the glass fiber surfaces by a moisture film such that little if any benefit is derived from the high strength properties of the glass fibers. Under such circumstances, wet strength is usually a small percent of the dry strength of the same product. Thus retention of the dry strength properties under wet conditions represents an unusual achievement in bonded glass fiber structures especially where the binder comprises an organic system. It has been found further that by the addition of the small amount of organo silicon fluid in addition to or in substitution for part of the lubricating oil, improvements are secured not only as between the wet strength and dry strength but both the wet strength and dry strength properties are increased by reason of the improved bonding relationship that is caused to be formed between the organic resinous binder and the glass fiber surfaces.

Characteristic also of systems heretofore produced of glass fiber-organic resinous binder systems is the effect of moisture to cause excessive swelling of the bonded glass fiber product under high humidity conditions. It has been found that the combination which makes use of silicone oils in the system described provides for considerable improvement even in respect to the resistance to swelling under all humidity conditions. For example, with the binder composition of Example 1 but with the silicone oil component omitted, when exposed to about 100 percent relative humidity, 7–14 percent swelling occurs in the binder when employed in tiles and better than 5 percent swelling occurs when employed in a pipe wrap. When the same binder system is formulated to contain as little as 0.2 percent silicone oil, as in Example 1, a maximum of 2–5 percent swelling occurs upon exposure of the tile to similar conditions of temperature and humidity and no swelling has been evidenced in the binder when employed in a pipe wrap. In addition to the foregoing, the combination which includes the silicone compound is unexpectedly improved from the standpoint of weathering and durability.

Suitable organo silicon oils and fluids are marketed by the Dow-Corning Corporation and by the General Electric Company. Their formulation and manufacture are well known such that detailed description thereof need not be given. When employed in the binder composition embodying the features of this invention, organo silicon oils or fluids can be present in an amount within the range of 0.1 to 2.0 percent by weight based upon the binder solids and preferably in an amount within the range of 0.1 to 0.5 percent by weight. Representative of the organo silicon fluids are the organo silicon oils marketed by Dow-Corning Corporation under the trade name "DC–1107" or its emulsified counterpart marketed under the trade name "DC XEF–165," and "A1100 Silicone" (α amino propyl triethoxy silane) marketed by Union Carbide & Carbon Corporation.

The following will represent the concepts of this invention from the broad as well as the narrow standpoint:

| Broad range, percent by weight | Narrow range, percent by weight | Materials |
|---|---|---|
| 3–35 | 5–15 | Melamine-formaldehyde resin. |
| 5–50 | 15–35 | Phenol-formaldehyde resin. |
| 5–50 | 10–25 | Alkyd resin. |
| 5–60 | 25–40 | Urea borate. |
| 1–10 | 1–4 | Oleaginous lubricant. |
| .04–3.0 | .06–0.5 | Organo silicon fluid. |

The following are specific illustrations of binder compositions representing the practice of this invention:

| Materials | Amounts (percent by weight) | | | | |
|---|---|---|---|---|---|
| | A | B | C | D | E |
| Urea borate | 25 | 30 | 40 | 30 | 30 |
| Melamine-formaldehyde resin | 10 | 14 | 15 | 10 | 10 |
| Phenol-formaldehyde resin | 25 | 30 | 20 | 25 | 25 |
| Alkyd resin | 30 | 25 | 30 | 25 | 25 |
| Oleaginous lubricant | 5 | 5 | 4 | 5 | |
| Silicone oil | .2 | .5 | .2 | | .5 |

The materials may be formulated into a treating composition in the manner as defined in Example 1 for subsequent application as a binder onto the glass fiber surfaces in the fabrication or molding of tile, pipe wrap, laminar and other structural products.

With reference now to the formulation of binder compositions for use with glass fibers in the manufacture of such molded tile, pipe wrap, laminar, roof decking and other acoustical and thermal insulation products, it has been found that the substitution of conventional oleaginous or petroleum lubricants with a small fraction thereof of an organo silicon fluid will enhance a number of the characteristics of the molded or bonded product without causing loss in the characteristics originally derived from the use of such oleaginous lubricants in the binder formulation.

Petroleum oils have been employed as a component in binders for products formed of glass fibers to provide lubricity for the glass fibers and to reduce the dust and fly in the fabric and in the utilization of the glass fiber product. This concept applies to phenol-formaldehyde binders, urea-formaldehyde binders, melamine-formaldehyde binders and the like glass fiber binder systems as well as the complex binder previously described as embodying the features of this invention. Petroleum oils are undesirable in such binder systems from the standpoint of the undesirable effect which the oils have in lessening the bond strength that is developed between the binder and the glass fiber surfaces. Some are of the opinion that the small amount of oil present in such binders will cause a loss of at least 50 percent of the bond strength which would otherwise be available if the binder were capable of being formulated without such oils.

It has been found, as previously described, that improved bonding strength, both wet and dry, can be achieved by a simple means of substituting a small part of the oleaginous lubricant with a silicon fluid. It would be undesirable to substitute the petroleum oil or other oleaginous glass fiber lubricant with a silicone fluid because of the much greater cost of the silicone fluids and because the oils have an important function in the lubrication and in flexibilizing the formed fabric and they operate further to cut down dusting and fly. On the other hand, the small amount of silicone fluid substituted or added in accordance with the concepts of this invention eliminates many of the undesirable effects which have been found to exist where lubricating oils have previously been used without the silicone component.

In brief, it has been found that the presence of a small amount of silicone oil or fluid as a part of the binder system greatly increases the bond strength, both wet and dry, and materially cuts down the differential heretofore experienced between dry strengths and wet strengths of the molded products. In addition to increasing the dry and wet strength and minimizing the differential, the presence of the organo silicon fluid in the binder system has a very desirable effect in cutting down and in some instances completely eliminating swelling of the resinous binder under high as compared to low humidity conditions.

In addition, improvements have been experienced in the development of lesser fumes during curing of the binder in the oven or in the forming hood, in reduced buildup of deposit on the conveyor elements or in the hoods in which and on which the fibers are processed in the manufacture of resinous bonded glass fiber products, in the reduction of curing temperature and in better control of the rate of cure, and in the greater savings of the binder composition and consumption as well as in the improved thermal characteristics of the binder from the standpoint of punking and thermal break-down.

These improvements are available from binder systems of the type previously described and in binder systems which are formulated of phenol formaldehyde resins, with or without Vinsol modification, urea or melamine formaldehyde resinous binder and the like organic resinous binders wherein lubricating oils have previously been incorporated as a component thereof to provide lubricity, flexibility, and resistance to dusting and fly.

It is sufficient to make use of an amount of silicone oil or fluid which is 2 percent by weight of the oleaginous component heretofore employed. While more can be used, the improvement in results is not compensated by the increase in cost. Nevertheless, it is undesirable to make use of more than 20 percent by weight silicone oil based upon the weight of the oleaginous lubricant component. Thus where oleaginous lubricants may be present in a composition in an amount ranging from 1–10 percent by weight, the organo silicon fluid can be employed in an amount within the range of 0.2 to 2.0 percent by weight of the binder solids.

The following will provide a comparison of binder compositions formulated with and without the concept previously described and embodied in a bonded glass fiber insulation product:

| Material | Amounts (percent by weight) | |
|---|---|---|
| | Composition A | Composition B |
| Urea borate (Tybon 5611) | 40 | 40 |
| Melamine formaldehyde resin (Resamine RD-140) | 10 | 10 |
| Phenol-formaldehyde resin | 35 | 35 |
| Alkyd resin (Hercules G-62 or Reichhold PX-342) | 15 | 15 |
| $K_2B$ oil | 5 | 5 |
| α-amino propyl triethoxy silane | 0 | 0.8 |
| Test results: | | |
| Moisture absorption (percent by weigh) | 2.01 | 2.17 |
| Swelling (in inches) | 0.13 | 0.03 |
| Swelling (percent thickness increase) | 12.7 | 2.7 |

| Material | Glass Binder Bond Strengths (grams load) | | |
|---|---|---|---|
| | A | B | C |
| Phenol-formaldehyde resin | 10.6 | 10.6 | 10.6 |
| Vinsol | 4.0 | 4.0 | 4.0 |
| Ammonium sulfate | | 0.11 | 0.11 |
| Tempering oil | | 3.75 | 3.75 |
| Silicone oil | | | .24 |

The bond strength dry was increased as between formulations A and B from an average value of about 460 grams load to 545 grams load. The wet strength in formulations A and B fell 60 percent whereas the reduction in wet strength in the product formed of composition C fell less than 30 percent of the original dry strength.

In the formulation of the foregoing compositions and in the previously described examples embodying the complex binder composition forming the subject matter of this invention, use can be made of a number of phenol formaldehyde resins including filtered resins and resins identified as soluble ash resins which have been ion exchanged by passage through a column of an ion exchange material in the hydrogen form. Improvements in wet and dry strengths have been experienced in the use of such water white ion exchange resins, notwithstanding the type or source of the untreated resin.

The following formulation is representative of a binder composition based upon substantial use of Vinsol extended phenol formaldehyde resin and melamine formaldehyde combinations for light colored insulation products having good thermal stability wherein silicone oils are employed in small amounts in addition to the lubricating oils to describe the improved bonding and thermal characteristics without loss of lubricity or flexibility, as previously pointed out:

| Composition | Formulation | |
|---|---|---|
| | Specific (percent by weight) | Broad range (percent by weight) |
| Phenol formaldehyde resin | 56 | 25-65 |
| Vinsol resin | 15 | 10-25 |
| Melamine formaldehyde resin | 30 | 15-40 |
| Lubricating oil | 5 | 2-10 |
| Organo silicon compound | 0.2 | 0.2-2.0 |
| Ammonium sulfate | 0.4 | |

Acid catalyst in amounts to adjust the pH of the ammonium sulfate solution.
Water in amounts to make up 1 gallon per 1.2 pounds of the above.

*Procedure.*—In the manufacture of heat resistant binder for molded pipe, the major amount of warm water is first introduced into a mixing tank and into this tank there is then added the Vinsol emulsion, the lubricating oil and the organo silicon emulsion with agitation for about 5–10 minutes. The phenol formaldehyde resin and the melamine formaldehyde resin is then added and the volume is brought up to the desired amount by the addition of cold water. The ammonium sulfate is thoroughly dissolved in a separate container and added as a solution to the binder composition with rapid agitation and then the acid catalyst is added prior to use of the binder composition in forming the molded product to catalyze the condensation reaction for resin formation.

With the above formulation applied in the manufacture of molded pipe, swelling of the molded pipe has been reduced from a value of 25–100 percent relative humidity to 2–3 percent. By the same token, the handling characteristics of the insulation at high humidity are also greatly improved by comparison with conventional phenol formaldehyde or melamine resinous bonded structures.

Sections molded of glass fibers bonded with the composition of the previous example are firm and of substantially better quality by comparison with standard phenol formaldehyde insulation products because drafting and weak spots are eliminated and because folds and furrows are drastically reduced. The heat resistance of the improved insulation enables the use thereof at temperatures continuously maintained within the range of 500° F. without fear of punking or volatilization of the binder. Even at 600° F. only small amounts of volatilization take place but punking is still resisted.

It will be apparent from the foregoing that improvements are made with respect to the increase in the bond strength of resinous bonded glass fiber structures and that noticeable improvements are achieved with respect to the increase of the wet strength properties of the bonded structures by comparison with the dry strength properties thereof.

Most noticeable is the marked increase in the thermal stability of a structure of the type described which is formulated still of organic resinous materials and which embodies all of the desirable characteristics from the standpoint of flexibility in use and cost available from the use of organic materials in the formulation of the binder system.

It will be understood that changes may be made in the details of formulation, application and in products molded thereof without departing from the spirit of the invention, especially as defined in the following claims.

I claim:
1. A binder composition for use in the manufacture of thermally stable bonded glass fiber structures comprising an aqueous system containing binder solids composed of

5–50 percent by weight of phenol-formaldehyde resin in a water soluble stage
3–35 percent by weight of a melamine-formaldehyde resin
5–50 percent by weight of an alkyd resin
5–60 percent by weight of urea borate
1–10 percent by weight of an oleaginous lubricant
.04–3.0 percent by weight of an organo silicon fluid.

2. A binder composition for use in the manufacture of thermally stable bonded glass fiber structures comprising an aqueous system containing binder solids composed of 15–35 percent by weight of phenol-formaldehyde resin in a water soluble stage
5–15 percent by weight of a melamine-formaldehyde resin
10–25 percent by weight of an alkyd resin
25–40 percent by weight of urea borate
1–4 percent by weight of an oleaginous lubricant
.06–0.5 percent by weight of an organo silicon fluid.

3. A binder composition for use in the manufacture of thermally stable bonded glass fiber structures consisting essentially of an aqueous system, the binder solids of which consist essentially of a phenol formaldehyde resin, a melamine formaldehyde resin, an alkyd resin, and a urea borate condensation reaction product in which the materials are present in an amount corresponding to 5–50 percent by weight of phenol-formaldehyde resin in a water soluble stage
3–35 percent by weight of a melamine-formaldehyde resin
5–50 percent by weight of an alkyd resin
5–60 percent by weight of urea borate and which includes in addition 1–10 percent by weight of an oleaginous lubricant.

4. A binder composition for use in the manufacture of thermally stable bonded glass fiber structures consisting essentially of an aqueous system, the binder solids of which consist essentially of a phenol formaldehyde resin, a melamine formaldehyde resin, an alkyd resin, and a urea borate condensation reaction product in which the materials are present in an amount corresponding to 5–50 percent by weight of phenol-formaldehyde resin in a water soluble stage
3–35 percent by weight of a melamine-formaldehyde resin
5–50 percent by weight of an alkyd resin
5–60 percent by weight of urea borate and which includes in addition .04–3.0 percent by weight of an organo-silicon fluid.

5. A binder composition for use in the manufacture of thermally stable bonded glass fiber structures consisting essentially of an aqueous system, the binder solids of which consist essentially of a phenol formaldehyde resin, a melamine formaldehyde resin, an alkyd resin, and a urea borate condensation reaction product in which the materials are present in an amount corresponding to 5–50 percent by weight of phenol-formaldehyde resin in a water soluble stage
3–35 percent by weight of a melamine-formaldehyde resin
5–50 percent by weight of an alkyd resin
5–60 percent by weight of urea borate.

6. A binder composition for use in the manufacture of thermally stable bonded glass fiber structures consisting essentially of an aqueous system, the binder solids of which consist essentially of a phenol formaldehyde resin, a melamine formaldehyde resin, an alkyd resin, and a urea borate condensation reaction product in which the materials are present in an amount corresponding to 15-35 percent by weight of phenol-formaldehyde resin in a water soluble stage
5-15 percent by weight of a melamine-formaldehyde resin
10-25 percent by weight of an alkyd resin
25-40 percent by weight of urea borate and which includes in addition 0.06-0.5 percent by weight of an organo-silicon fluid.

7. A binder composition for use in the manufacture of thermally stable bonded glass fiber structures consisting essentially of an aqueous system, the binder solids of which consist essentially of a phenol formaldehyde resin, a melamine formaldehyde resin, an alkyd resin, and a urea borate condensation reaction product in which the materials are present in an amount corresponding to 15-35 percent by weight of phenol-formaldehyde resin in a water soluble stage
5-15 percent by weight of a melamine-formaldehyde resin
10-25 percent by weight of an alkyd resin
25-40 percent by weight of urea borate.

8. A composition as claimed in claim 1 in which the organo silicon compound is an amino propyl triethoxy silane.

9. A thermally stable bonded glass fiber structure formed of glass fibers bonded by a composition of claim 1 advanced to a cured stage.

10. A thermally stable bonded glass fiber structure formed of glass fibers bonded by a composition of claim 2 advanced to a cured stage.

11. A thermally stable bonded glass fiber structure formed of glass fibers bonded by a composition of claim 3 advanced to a cured stage.

12. A thermally stable bonded glass fiber structure formed of glass fibers bonded by a composition of claim 4 advanced to a cured stage.

13. A thermally stable bonded glass fiber structure formed of glass fibers bonded by a composition of claim 5 advanced to a cured stage.

14. A thermally stable bonded glass fiber structure formed of glass fibers bonded by a composition of claim 6 advanced to a cured stage.

15. A thermally stable bonded glass fiber structure formed of glass fibers bonded by a composition of claim 7 advanced to a cured stage.

References Cited in the file of this patent

UNITED STATES PATENTS

| | | |
|---|---|---|
| 2,351,802 | Bergin et al. | June 20, 1944 |
| 2,418,525 | Pollak | Apr. 8, 1947 |
| 2,494,810 | Hobday et al. | Jan. 17, 1950 |
| 2,541,896 | Vasileff et al. | Feb. 13, 1951 |
| 2,602,037 | Nelb | July 1, 1952 |
| 2,681,894 | Hoenel | June 22, 1954 |